C. FREMONT.
SHAFT OR AXLE CRANK.
APPLICATION FILED FEB. 28, 1905.

958,958.

Patented May 24, 1910.

Witnesses:

Inventor:
Charles Fremont,
By Wm E. Boulter
Attorney

UNITED STATES PATENT OFFICE.

CHARLES FREMONT, OF PARIS, FRANCE.

SHAFT OR AXLE CRANK.

958,958.  Specification of Letters Patent. Patented May 24, 1910.

Application filed February 28, 1905. Serial No. 247,770.

*To all whom it may concern:*

Be it known that I, CHARLES FREMONT, a citizen of the French Republic, residing at Paris, in France, have invented certain new and useful Improvements in Shaft or Axle Cranks, of which the following is a specification.

This invention relates to the construction of metal parts exposed to shocks, such as for instance, cranks of cranked axles or shafts of cars or locomotives, the crank shafts of engines, pumps and the like which are subjected to bending stresses, shocks, vibrations or repeated alternate strains, and is particularly adapted to avoid premature rupture.

As is well known, in the resistance of the body to bending movements the greater part of the strain is taken up by the exterior portion of the metal. With the crank according to the present invention a greater resistance to such bending moments is obtained than with a crank in which the same quantity of metal is used in one solid mass.

Figure 1:
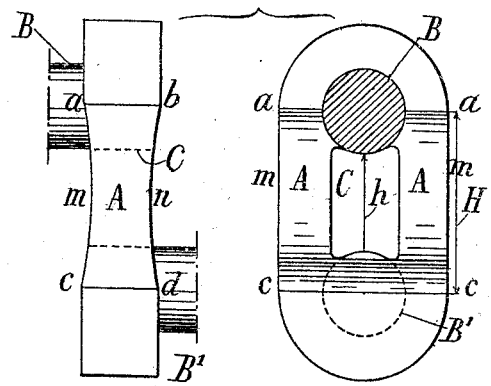
Figure 2:
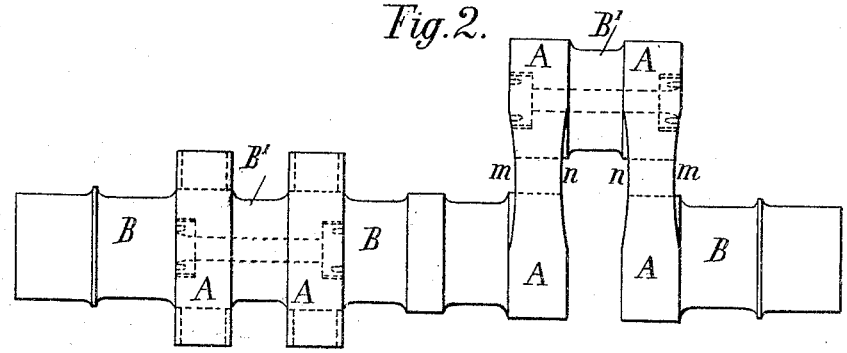
Figure 3:
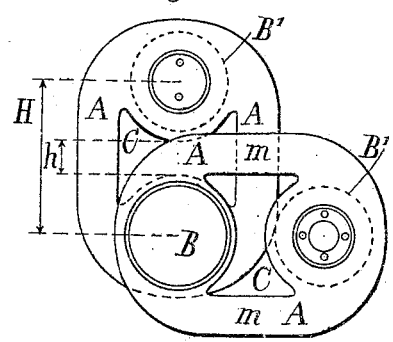

Referring to the drawings, Figure 1 illustrates a front and side elevation of the new construction of a crank member. Figs. 2 and 3 are front and side elevations respectively of the construction of a double crank.

The crank member is lightened or reduced at its sides $a\ m\ c\ b\ n\ d$ and a hole C is provided between the solid or hollow shaft B and crank pin B'. In this way a shape is obtained for the crank arms A A having a uniform resilience and permitting the maximum of bend under the maximum strain not exceeding the elastic limit of the metal. The effect of the hole C is that the bending strain is transmitted laterally to the crank arms A A, and so a possible deflection under a given stress is increased materially, as owing to the presence of this hole the bending takes place through a solid body having a length H equal to the distance from axis to axis of the parts B B' and this is materially larger than the distance $h$ between the exteriors of said parts, or in other words, the width of the hole C.

As shown in Figs. 2 and 3 in a double crank constructed in accordance with the above method, the crank arms A are lightened at $m\ n$ and a hole C is provided between the shaft B and crank pin B'.

What I claim as my invention and desire to secure by Letters Patent is:—

1. A crank shaft or bent axle connection comprising a shaft and a crank pin and crank members connecting the same, said members each comprising two symmetrical arms situated in close proximity and parallel laterally to tangents joining the outer surfaces of the shaft and the crank pin, the said arms joining each other about the outer surface of said shaft and crank pin and being of uniform thickness measured in a direction transverse to the latter members, but of varying thickness longitudinally, the thickness being a maximum at the bearings of the shaft and crank pin and a minimum at the midde point between the same.

2. A crank shaft or bent axle connection comprising a shaft and a crank pin and crank members connecting the same, said members each comprising two symmetrical arms situated laterally at the exterior of tangents joining the outer surfaces of the shaft and crank pin, said arms joining each other about the outer surfaces of said shaft and crank pin and being of uniform thickness measured in a direction transverse to the shaft, but of varying thickness longitudinally, the thickness being a maximum at the bearings of the shaft and crank pin and a minimum at the middle point between the same.

In testimony whereof I have signed my name to this specification in the presence of two subscribing witnesses.

CHARLES FREMONT.

Witnesses:
 ALBERT MAULVAULT,
 HANSON C. COXE.